E. O. Carrington
Impt in Mosketo and Fly Nets.

72452

PATENTED
DEC 24 1867

Witnesses.
Geo. Dennett Walker
Geo. S. Pinckney

E. O. Carrington
per L. W. Serrell
Atty.

United States Patent Office.

EBEN O. CARRINGTON, OF PHILADELPHIA, PENNSYLVANIA.

Letters Patent No. 72,452, dated December 24, 1867.

IMPROVED MOSQUITO AND FLY-NET.

The Schedule referred to in these Letters Patent and making part of the same.

TO ALL WHOM IT MAY CONCERN:

Be it known that I, EBEN O. CARRINGTON, of the city and county of Philadelphia, and State of Pennsylvania, have invented and made a certain new and useful Improvement in Mosquito and Fly-Nets; and I do hereby declare the following to be a full, clear, and exact description of the said invention, reference being had to the annexed drawing, making part of this specification, wherein—

Figure 2:
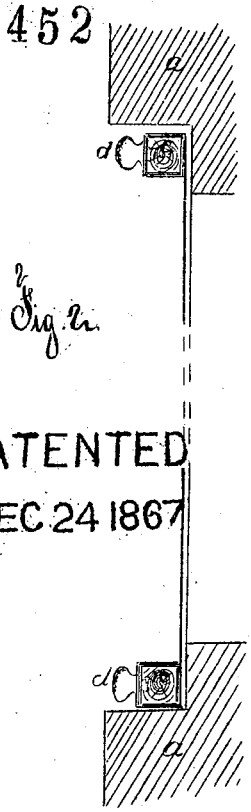
Figure 1:
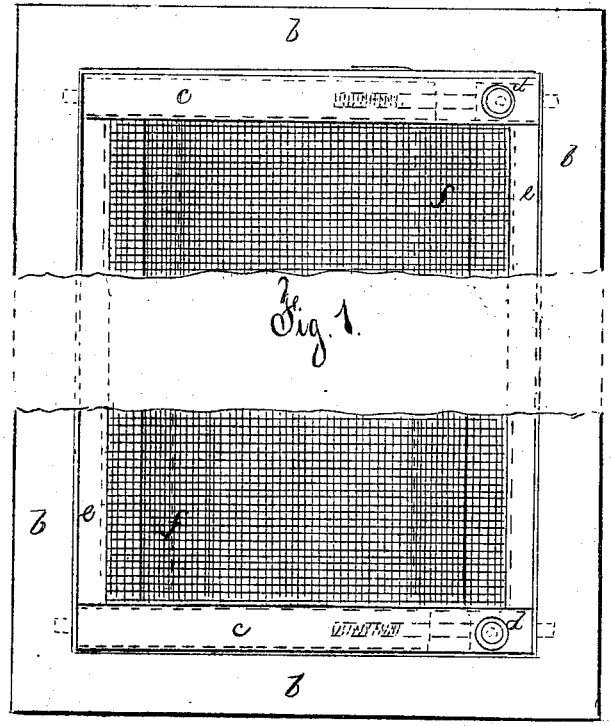
Figure 3:
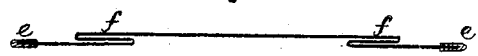

Figure 1 is an elevation showing the top and bottom portions of the netting at one side of a window, Figure 2 is a section of the netting and window-casing, and Figure 3 is a sectional plan of the netting, showing the fold near the edge thereof.

Similar marks of reference denote the same parts.

My invention consists in a squared or polygonal bar, with pins, bolts, or catches at its ends, and formed so as to be sprung into place in the window-frame, and the netting is extended from one bar at the top to another bar at the bottom of the opening, to be covered by the netting, and the vertical edges of said netting are strengthened and kept under tension by tapes or strips of muslin, to which the edges are sewed, and folds are formed in the netting, near the edges thereof, that allow the netting to be forced partially outwards or inwards by the wind, or to be shrunk by the weather, without the sides of said netting being drawn away from the window-frame. Thus I am enabled to obtain any desired tension between the top and bottom bars of the netting by turning one or both partially around to wind the netting upon it, and then its polygonal form prevents its turning, in consequence of one of its flat sides setting against the casing, and at the same time the netting is sufficiently loose widthwise, in consequence of said folds, to prevent the wind or shrinkage causing the edges to draw away from the frames.

In the drawing, $a$ represents a portion of the window-frame; $b$, the casing. $c$ is a polygonal bar, of a length to suit the space. A spike or pin is introduced at each end, and a section of the bar near one end is made contractible by one part running into a hole in the other, and a helical spring is introduced to project such section, and cause its end pin to enter a hole provided for it in the window-casing, and these holes for the pins of the respective ends of the top and bottom bars are to be sufficiently close into an angle of the frame or casing to prevent the bar being turned, until the same is taken from said position by drawing in the movable end section, and freeing the end pin of the bar. I provide a knob, $d$, that may be screwed to either of the sides of the movable end section of the bar $c$.

The bars $c$ are covered with muslin, and to this covering is sewed the mosquito-netting that extends from one bar to the other. $e$ is the tape or muslin strip sewed to each edge of the netting, and its ends attached to the bars $c$. The fold $f$ is provided in the netting, running from one roller to the other, near the edge of the netting, for the purposes aforesaid.

What I claim, and desire to secure by Letters Patent, is—

The polygonal bars $c$, with end spring sections, in combination with the tapes or strips $e$ and fold $f$, as and for the purposes specified.

In witness whereof, I have hereunto set my signature, this 20th day of August, A. D. 1867.

E. O CARRINGTON.

Witnesses:
 E. J. CARRINGTON,
 I. G. BENEDICT.